United States Patent [19]
Babintsev

[11] 3,922,739
[45] Dec. 2, 1975

[54] APPARATUS FOR CONVERTING SEA WAVE ENERGY INTO ELECTRICAL ENERGY

[76] Inventor: Ivan Andreevich Babintsev, Bulvar Yana Rainisa, 20, korpus 2, kv. 152, Moscow, U.S.S.R.

[22] Filed: Apr. 18, 1974

[21] Appl. No.: 462,090

[52] U.S. Cl............................ 9/8 R; 290/42; 290/53
[51] Int. Cl.² ........................................ B63B 21/52
[58] Field of Search ............................ 9/8 R, 8.3 E; 60/497–498; 185/30; 61/20; 290/42–44, 52–55; 415/149 R, 149 A

[56] References Cited
UNITED STATES PATENTS

| | | | |
|---|---|---|---|
| 1,978,809 | 10/1934 | Moody................................. | 415/149 |
| 3,064,137 | 11/1962 | Corbett, Jr. et al. ................. | 290/53 |
| 3,200,255 | 8/1965 | Masuda................................ | 290/53 |

FOREIGN PATENTS OR APPLICATIONS

| | | | |
|---|---|---|---|
| 884,930 | 7/1949 | Germany ............................. | 290/52 |

Primary Examiner—George E. A. Halvosa
Assistant Examiner—Jesus D. Sotelo
Attorney, Agent, or Firm—Haseltine, Lake & Waters

[57] ABSTRACT

An apparatus for converting sea wave energy into electrical energy, comprising a buoy which executes periodic forced vibrations, with a natural frequency approximating the wave frequency, along the vertical axis of the buoy in a manner that the buoy moves with respect to the wave surface, and a turbogenerator for converting the air flow stream kinetic energy into electrical energy. The buoy is provided with an air chamber and a hydraulic piston, the air chamber communicating through an air duct with the turbogenerator. The latter includes a generator, a turbine stage with a stator and a rotor mounted on the same shaft with the generator. The turbogenerator turbine stage is provided with a supplementary stator disposed downstream of the turbine rotor and made symmetrical with the turbine stage stator with respect to the plane of rotation of the rotor.

1 Claim, 4 Drawing Figures

APPARATUS FOR CONVERTING SEA WAVE ENERGY INTO ELECTRICAL ENERGY

The present invention relates to maritime navigation, and more particularly to apparatus for converting sea wave energy into electrical energy.

The apparatus of this invention can most advantageously be used as power sources for navigation equipment of buoyage system markers, for example, flashing buoys, radio buoys and acoustic buoys.

The proposed apparatus may also be used as power sources for alarm and remote control devices supported on piles and installed on landmarks.

The apparatus of the present invention may find extensive application as self-contained power sources for various consumers in open sea, such as special oceanographic buoys, automatic hydrometeostations on buoys, and the like.

Another possible use for the proposed apparatus can be found in supplying power to apparatus for cathodic protection of underwater steel structures and shore abutments against corrosion, as well as to saline water conversion plants.

At present, electric power is supplied to navigation equipment on sea buoys from electrochemical power units, e.g. manganese-zinc batteries.

There are one-shot batteries and have to be periodically changed. Batteries are changed once a year or once in a shipping season, i.e. 6 to 8 months.

Generally, batteries are changed when buoys are taken ashore for annual repair and repainting. In some cases, when buoys are still in good repair and the condition of coating is satisfactory, batteries are changed in open sea, which calls for additional costs and involves a certain degree of risk because the sea is not always calm when it comes to changing batteries on sea buoys.

The high cost and complicated servicing of one-shot electrochemical power units have given impetus to a search for new power sources for navigation equipment on sea buoys, and as a result of this search there have been developed apparatus for converting sea wave energy into electrical energy.

An apparatus of this kind is known, which is provided with an air motor actuated by the air forced out under a certain pressure from an air chamber with a hydraulic piston and directed by an air duct to the motor.

The apparatus comprises a buoy provided with a weight placed at its bottom to ensure the vertical stability of the buoy.

The buoy has an air chamber, the bottom portion whereof communicates with the sea and the top portion communicates with the atmosphere through an air duct. The air duct accomodates an air motor coupled with the generator shaft.

The storage battery supplying power to consumers, e.g. a flashing light marker or a radiobeacon, under no-wind conditions when the generator fails to produce a sufficient amount of electrical energy, is disposed in a sealed compartment of the buoy. The battery is connected to the generator and to the consumers. The capacity of the battery is selected having regard to the longest periods of calm common in the aquatorium where the buoy is moored.

When the sea is wavy, seawater periodically enters into and emerges from the air chamber. The water level in the air chamber periodically rises, for example during the first wave half-period, and, acting as a hydraulic piston, forces the air out of the chamber, when a certain overpressure is built up therein, into the atmosphere through the air duct.

The airstream at the outlet of the air duct actuates the air motor together with the generator.

The current produced by the generator is used for charging the battery and is fed to consumers, e.g. a flashing light marker, a radiobeacon or a fog horn.

As the water level periodically goes down, for example during the second wave half-period, the pressure in the air chamber drops sharply with the result that the atmospheric air penetrates the air chamber through the air duct, thereby exerting braking action on the rotating air motor.

The air motor together with the generator still rotate by inertia at the expense of the kinetic energy stored by the rotors of the air motor and the generator when they were vigorously acted upon by the air flow during the preceding (first) wave half-period. Thus, in this prior art apparatus, the air flow acts vigorously upon the motor only during the first wave half-period. The second wave half-period is wasted, which substantially reduces the total efficiency of the apparatus and the generation of electrical energy, particularly when the sea is relatively calm.

The low efficiency of the apparatus is mainly due to the fact that when the sea is relatively calm, the generator produces electrical energy in an amount sufficient to power the consumers and recharge the battery only during the first wave half-period. During the second wave half-period, the generator is idle, and the consumers are powered by the energy stored by the battery during the first wave half-period. Hence, the generator fails to continuously produce electrical energy. The inability of the generator to continuously produce electrical energy results in additional losses of energy which is expended to recharge the battery, thereby lowering the efficiency of the apparatus as a whole.

Another disadvantage inherent in the prior art apparatus for converting sea wave energy into electrical energy is that the air motor is only actuated when air is forced out of the chamber, i.e. during an interval roughly equal to a wave half-period. The energy of the second wave half-wave is not utilized, which materially lowers the efficiency of the apparatus.

Another apparatus for converting sea wave energy into electrical energy is known which comprises a buoy with a weight ensuring its vertical stability, the buoy executing periodic forced vibrations with a natural frequency approximating the wave frequency, and a turbogenerator. The buoy has an air chamber with a hydraulic piston. The turbogenerator includes a turbine stage and a generator. The air chamber communicates with the atmosphere through valves disposed in a supplementary chamber communicating with the air chamber. The supplementary chamber is divided by a partition into two chambers: high-pressure chamber and low-pressure chamber. The high-pressure chamber is provided with an admission valve through which it communicates with the air chamber and a delivery valve therethrough it communicates with the atmosphere. A hole is made in the partition for the generator shaft to pass therethrough, as well as nozzles directing the flow of air to the blades of the turbine rotor. The rotor is disposed in the low-pressure chamber and is seated on the same shaft with the generator which is disposed in the high-pressure chamber.

A system of admission and delivery valves arranged on the walls of the high-pressure and low-pressure chambers ensure air delivery to the rotor of the turbine stage in one direction both when the air in the buoy air chamber is forced out into the atmosphere (first wave half-period) and when air is drawn from the atmosphere into the air chamber (second wave half-period).

This prior art apparatus operates as follows.

When the sea is wavy, the buoy oscillates along its vertical axis. The water level in the air chamber goes up and down and, acting as a hydraulic piston, forces the air in the air chamber out into the atmosphere, for example during the first wave half-period, them air is sucked from the atmosphere into the air chamber during the second wave half-period. As the water level in the buoy air chamber rises, for example during the first wave half-period, air is forced out of the air chamber through the delivery valve into the high-pressure chamber. Then, from the high-pressure chamber, air is directed by the nozzles to the turbine rotor and flows into the low-pressure chamber. And, finally, from the low-pressure chamber spent air is vented through the delivery valve into the atmosphere.

When the water level in the buoy air chamber goes down, for example during the second wave half-period, air is drawn from the atmosphere into the high-pressure chamber through the admission valve. From the high-pressure chamber, air then flows through the nozzles to the turbine rotor and, further, to the low-pressure chamber. Finally, from the low-pressure chamber, air flows through the admission valve into the buoy air chamber.

Thus, the system consisting of two chambers and four valves ensures the flow of air through the turbine stage in one direction only, namely from the high-pressure chamber into the low-pressure chamber. Therewith, the turbine and the generator execute useful work both when the water level in the buoy air chamber goes up (first wave half-period) and down (second wave half-period).

This prior art apparatus suffers from the following disadvantages: first, complexity of structure, excessively great size and weight, due to the provision of high- and low pressure chambers and admission and delivery valves; second, low reliability in operation due to the admission and delivery valves being prone to failure; third low power of the turbogenerator resulting in lower output of electrical energy, this disadvantage being due to additional losses of energy caused by the necessity to defeat the hydraulic friction occuring when air flows through the admission and delivery valves, as well as due to the low reliability of the valves.

It is, therefore, an object of the present invention to obviate the above disadvantages.

The present invention aims at increasing the power and output of an apparatus for converting sea wave energy into electrical energy of the turbogenerator by utilizing the energy of both wave half-periods.

Another object of the invention is to enhance the reliability of the proposed apparatus in operation.

Still another object of the invention is to simplify the structure of the proposed apparatus, as well as to reduce its size and weight.

With these and other objects in view, the present invention resides in that in an apparatus for converting sea wave energy into electrical energy, comprising a buoy which executes periodic forced vibrations, with a natural frequency approximating the wave frequency, along the vertical axis thereof so that the buoy moves with respect to the wave surface, the buoy having an air chamber with a hydraulic piston, which air chamber communicates through an air duct with a turbogenerator for converting the airflow kinetic energy into electrical energy, the turbogenerator including a generator and a turbine stage with a stator and a rotor mounted on the same shaft with the generator, all these components of the turbogenerator being arranged in that order downstream with respect to the airflow direction, the turbine stage of the turbogenerator is, according to the invention, provided with a supplementary stator disposed downstream of the turbine rotor and made symmetrical with the turbine stage stator with respect to the plane of rotation of the rotor.

Such an arrangement of the apparatus for converting sea wave energy into electrical energy, where the turbine stage is provided with a supplementary stator which is made symmetrical with the turbine stage stator with respect to the plane of rotation of the rotor, permits the rotor to rotate in one sense only while air flows through the turbine stage reversibly. This feature substantially increases the average power and output of the turbogenerator due to utilizing the energy of both wave half-periods and a more uniform rotation of the rotor.

The proposed apparatus is free of valves and other moving devices for converting the energy of both wave half-periods into electrical energy, and the kinetic energy of the reversible airflow during both wave half-periods is used to directly rotate the turbine rotor in one sense only, which substantially enhances the reliability of the proposed apparatus in operation.

The small size and light weight of the apparatus are achieved due to the absence of high-pressure and low-pressure chambers as well as admission and delivery valves.

No additional losses of energy occur in the proposed apparatus in contrast to a prior art apparatus in which energy is expended to defeat the hydraulic friction caused by the air flowing through admission and delivery valves; as a result, the proposed apparatus is marked by highly efficient conversion of sea wave energy into electrical energy, and the average power and output of the turbogenerator are substantially increased.

Other advantages and features of the present invention will become more evident from the following description in which preferred embodiments thereof are set forth in detail in conjunction with the accompanying drawings, wherein.

Figure 1:
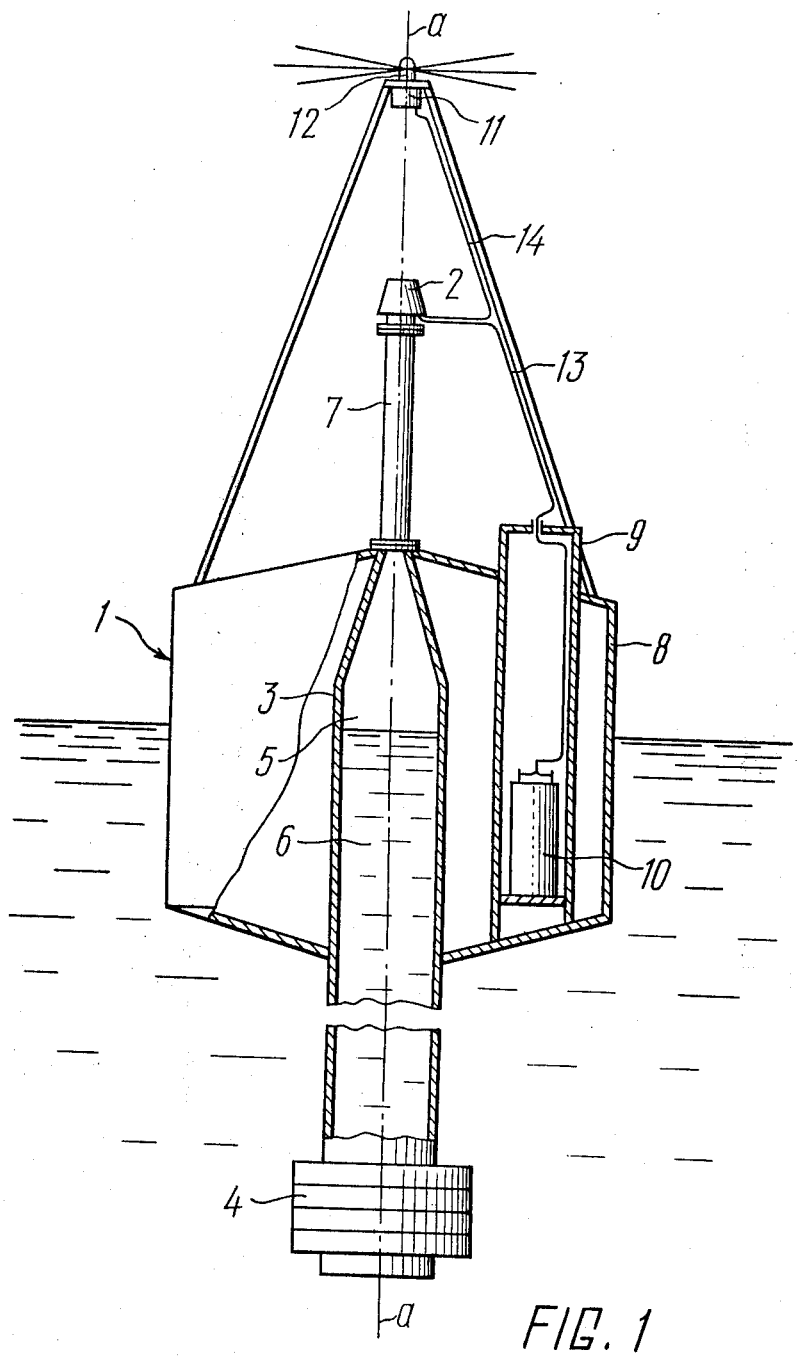
FIG. 1 is a longitudinal section view of an apparatus for converting sea wave energy into electrical energy, according to the invention.

Referring now to FIG. 1, the apparatus for converting sea wave energy into electrical energy comprises a buoy 1 which executes periodic forced vibrations, with a natural frequency approximating the wave frequency, along the vertical axis *a—a* thereof so that the buoy 1 moves with respect to the wave surface, and a turbogenerator 2 for converting the airflow kinetic energy into electrical energy.

The buoy 1 includes a tube 3 with a weight 4 ensuring the vertical stability of the buoy. The tube 3 defines an air chamber 5 with a hydraulic piston 6, the bottom portion of the air chamber 5 communicating with the sea and the top portion communicating with the atmosphere through an air duct 7. The body 8 of the buoy 1 is provided with a compartment 9 with naturally circulating airflow, which accomodates a storage battery 10 for energizing a device 11 supplying power pulses to an incandescent lamp 12 which flashes out light signals.

The turbogenerator 2 is mounted at the end of the air duct 7 and is connected to the storage battery 10 by means of a cable 13 and to the device 11 by means of a cable 14.

A casing 15 (FIG. 2) houses a generator 16 and a turbine stage 17 which is provided with a supplementary stator 18.

The generator 16 has a stator 19 which is seated in the bore of the casing 15 and a rotor 20 fitted onto a shaft 21 mounted on radial ball bearings 22. The rotor 20 of the generator 16 is made from an alloy possessing the properties of a permanent magnet in the form of an eight-pointed star. The shaft 21 of the generator 16 is axially fixed by means of a nut 23 which locks an inner race 24 of the ball bearing 22 on the shaft 21 of the generator 16, and a cap 25 is provided to secure an outer race 26 of the ball bearing 22 in the casing 15.

Figure 2:
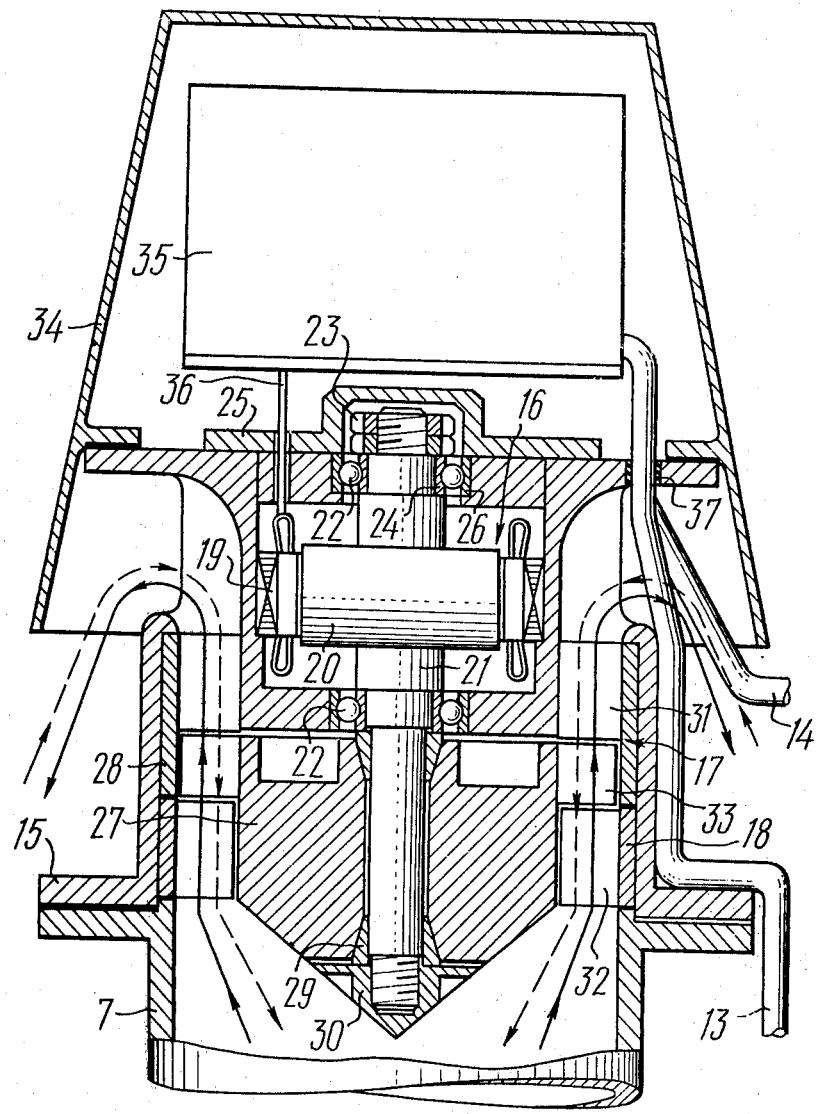
FIG. 2 is an enlarged longitudinal-section view of the turbogenerator of the apparatus for converting sea wave energy into electrical energy, according to the invention.
Figure 3:
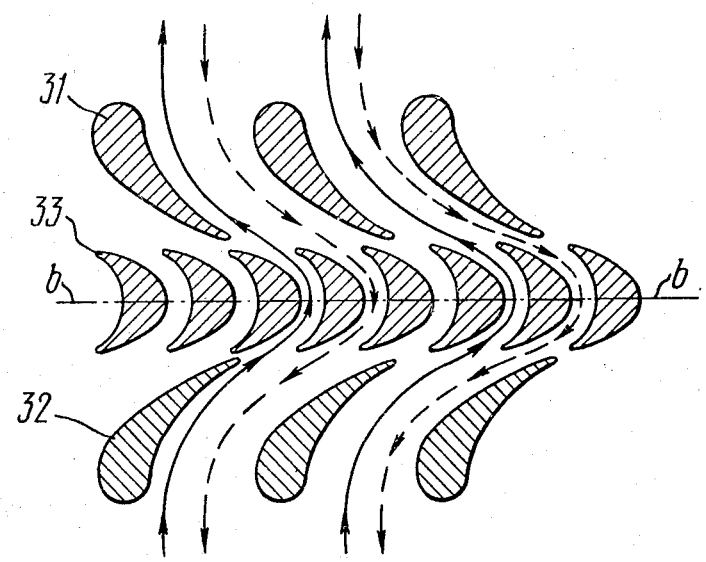
FIG. 3 is a schematic representation of the stator vanes and rotor blades and the path of the air flowing therethrough.

The turbine stage 17 of the turbogenerator 2 includes a rotor 27 fitted onto the shaft 21 of the generator 16 and a stator 28. The stator 18 is arranged downstream of the turbine rotor 27 and symmetrically with the stator 28 of the turbine stage 17 with respect to the plane of rotation (FIG. 3) of the turbine rotor 27 (FIG. 2).

The rotor 27 of the turbine stage 17 is fitted onto the shaft 21 of the generator 16 by means of taper collets 29 and a nut 30.

The stator 28 has vanes 31, and the supplementary stator 18 has vanes 32 for directing the airflow to blades 33 of the turbine rotor 27.

The casing 15 is provided with a bonnet 34 the sealed cavity thereof houses a rectifier-stabilizer unit 35 electrically connected by means of leading-out conductors 36 to the stator 19 of the generator 16.

The rectifier-stabilizer unit 35 is intended to rectify the alternating current of the generator 16 into direct current and to stabilize the rectified current voltage.

From the rectifier-stabilizer unit 35, (FIG. 2) the rectified current is fed through the cable 13 to charge the storage battery 10 (FIG. 1), and the stabilized voltage is applied to the device 11 (FIG. 1) through the cable 14. Clands 37 (FIG. 2) are provided at the points where the cables 13 and 14 are brought out of the casing 15.

The apparatus for converting sea wave energy into electrical energy operates as follows.

When the sea is wavy, the buoy 1 (FIG. 1) executes periodic forced vibrations, with a natural frequency approximating the wave frequency, along the vertical axis *a—a* thereof.

During the first wave half-period, the hydraulic piston 6 in the tube 3 of the buoy 1 goes up creating an overpressure in the air chamber 5, thereby forcing out the air from the air chamber 5 through the air duct 7, supplementary stator 18 (FIG. 2), turbine rotor 27 and stator 28 into the atmosphere. Therewith, the airflow shown in FIGS. 2 and 3 by a solid line with arrows passes between the vanes 32 of the supplementary stator 18, blades 33 of the turbine rotor 27 and vanes 31 of the stator 28, making the turbine rotor 27 to rotate clockwise.

During the second wave half-period, the hydraulic piston 6 (FIG. 1) in the tube 3 of the buoy 1 moves down bringing about a decompression in the air chamber 5 and air duct 7 with the result that atmospheric air is sucked in and flows through the stator 28 (FIG. 2), turbine rotor 27, suplementary stator 18 and air duct 7 (FIG. 1) into the air chamber 5 of the tube 3 of the buoy 1. Therewith, the airflow shown in FIGS. 2 and 3 by a broken line with arrows passes between the vanes 31 of the stator 28, blades 33 of the turbine rotor 27 and vanes 32 of the stator 18, making the turbine rotor 27 to rotate clockwise.

In both cases, i.e. when air flows through the supplementary stator 18 and turbine stage 17 in both directions, the turbine rotor 27 always rotates clockwise.

At the moment of reversal of the airflow through the stator 18 and turbine stage 17, the uniformity of rotation of the rotor 27 is maintained at the expense of the kinetic energy of rotation of the rotor 20 of the generator 16 and the turbine rotor 27.

Thus, the kinetic energy of the reversible airflow through the turbine stage 17 provided with a supplementary stator 18 is converted into the mechanical energy of rotation of the turbine rotor 27 which rotates in one sense only, namely clockwise.

The rotation of the turbine rotor 27 fitted onto the shaft 21 of the generator 16 is transmitted to the rotor 20 of the generator 16.

As the rotor 20 rotates, a three-phase alternating current is excited in the stator 19 of the generator 16, which is fed through the conductors 36 to the rectifier-stabilizer unit 35.

The rectifier-stabilizer unit 35 rectifies the alternating current into direct current and stabilizes the rectified current voltage at a predetermined level which is set no more than 10% above the rated value of the voltage supplied to consumers, e.g. the device 11 and incandescent lamp 12.

From the rectifier-stabilizer unit 35 (FIG. 2), the rectified current is fed through the cable 13 to charge the storage battery 10 (FIG. 1).

The rectified current stabilized voltage from the rectifier-stabilizer unit 35 (FIG. 2) is applied through the cable 14 to the device 11 (FIG. 1) and to the incandescent lamp 12 connected to the device 11, the lamp 12 flashing out light signals in a particular sequence (on-off) in accordance with power pulses generated by the device 11 to energize the incandescent lamp 12.

The capacity of the storage battery 10 is selected such as to ensure self-contained power supply (1 V) of the buoy consumers over periods of calm lasting from 5 to 20 days depending on wind and sea conditions on the aquatorium where the buoy with the proposed apparatus for converting sea wave energy into electrical energy is employed.

The apparatus of the present invention has been tested under operating conditions in wavy sea, the height of waves ranging from 0.2 to 2 m.

Figure 4:
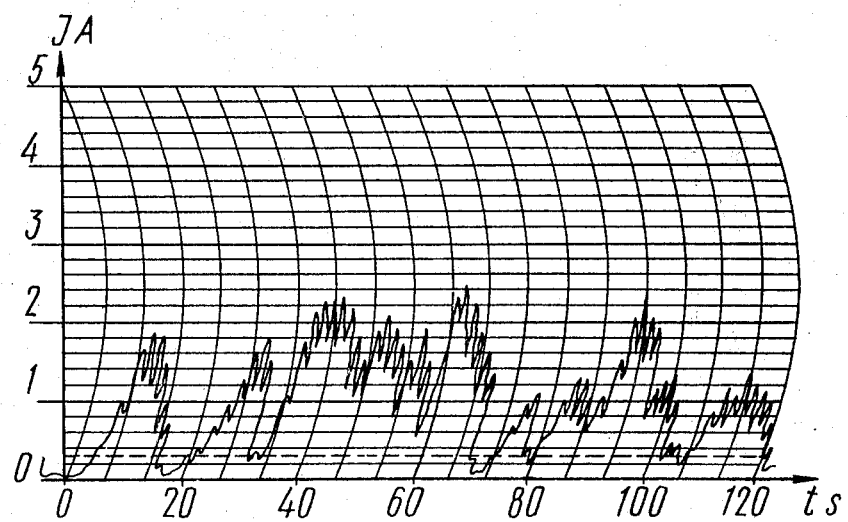
FIG. 4 shows an actual chart recording of the rectified current produced by the turbogenerator of the apparatus for converting sea wave energy into electrical energy, according to the invention.

A chart recording of the rectified current produced by the turbogenerator 2 at a wave height of 0.5 m is represented in FIG. 4 wherein plotted on the ordinate is the amperage of the rectified current I produced by the turbogenerator 2 and plotted on the abscissa is time (*t*).

It took 2 minutes to produce the recording of the rectified current of the turbogenerator 2, shown in FIG. 4. As can be seen from the chart, the intensity of the rectified current produced by the turbogenerator 2 varies within a wide range, from 0.1 to 2.4 A. The area delimited by the rectified current curve and the abscissa determines, on a respective scale, the amount of electrical energy, in ampere-hours, produced by the turbogenerator 2 during recording.

The ratio between the area delimited by the rectified current curve and the abscissa and the recording time determines the mean value of the rectified current produced by the turbogenerator 2 over a period of time equal to the time of recording the characteristics of the turbogenerator 2. This mean value of the rectified current of the turbogenerator 2, taken under operating conditions, the height of waves reaching 0.5 m, is equal to 1.1 A, the voltage across the terminals of the storage battery 10 being equal to 12.7 V. The mean value of the rectified turbogenerator current is shown in FIG. 4 by the solid horizontal line.

Tests conducted under operating conditions with waves as high as 0.5 m have revealed that the turbogenerator 2 supplies, according to the invention, a power output with respect to the rectified current equal to $P = 1.1 \cdot 12.7 = 14W$, on the average.

When power is supplied to the device 11 and 23-W incandescent lamp 12 flashing out 1-sec light signals at 5 sec intervals, the value of the consumed load current is $$I' = I_1 + \frac{P_1}{U} \cdot \frac{1}{1+5} = 0.02 + \frac{23}{12.7} \cdot \frac{1}{6} = 0.32 \, A$$

wherein
- $I_1$ is the intensity of the current consumed by the device 11;
- $P_1$ is the power of the incandescent lamp 12 at the moment of flashing out a light signal;
- $U$ is the turbogenerator voltage with respect to the rectified current.

According to the invention, there are four conditions of supplying power to the consumers of the buoy 1, the device 11 and incandescent lamp 12 (FIG. 1), from the apparatus for converting sea wave energy into electrical energy.

Condition 1: very smooth sea; wave height is below 0.2 m; mean intensity of the rectified current produced by the turbogenerator 2 is below 0.32 A. In this case, the buoy consumers are powered both by the current produced by the turbogenerator 2 and by the discharging storage battery 10.

The mean value of the battery discharge current is
$I_2 = 0.32 - I$,
wherein:
- $I_2$ is the mean value of the discharge current of the storage battery 10;
- $I$ is the mean value of the rectified current produced by the turbogenerator 2.

This condition of supplying power to the buoy consumers, which occurs when the sea is very smooth (wave height of 0.2 to 0.3 m) brings about a slow (gradual) discharge of the storage battery 10.

Condition 2: smooth sea; wave height from 0.2 to 0.3 m; mean intensity of the rectified current produced by the turbogenerator 2 is equal to 0.32 A. In this case, the current produced by the turbogenerator 2 is fully utilized by the consumers of the buoy 1.

This condition is characterized by zero discharge of the storage battery 10, since the current produced by the turbogenerator 2 is sufficient to power the consumers of the buoy 1.

Condition 3: rough sea; wave height is well above 0.3 m; mean intensity of the rectified current produced by the turbogenerator 2 exceeds 0.32 A. In this case, the power demands of the consumers of the buoy 1 are fully satisfied by the turbogenerator 2, and the excessive rectified current is utilized for recharging the storage battery 10.

The mean battery charge current value is
$I_3 = I - 0.32$,
wherein:
- $I_3$ is the mean value of the charge current of the storage battery 10;
- $I$ is the mean value of the rectified current produced by the turbogenerator 2.

This condition is characterized by gradual accumulation in the storage battery 10 of the electrical energy which may be used to power the consumers of the buoy 1 when the sea becomes calm.

Condition 4: calm sea; no waves; the turbogenerator 2 comes to rest or continues to rotate slowly by inertia failing to produce sufficient current to power the consumers of the buoy 1.

In this case, the consumers of the buoy 1 are powered entirely by the storage battery 10, the discharge current whereof is equal, in this condition, to 0.32 A.

In condition 4, the storage battery 10 discharges more intensively as compared to condition 1.

The storage battery 10 will keep discharging until sea conditions change to become suitable for conditions 2 and 3.

Changeover from one operating condition to another, in accordance with sea conditions, is smooth and involves no switchings in the electric circuitry of the apparatus for converting sea wave energy into electrical energy.

What is claimed is:

1. An apparatus for converting sea wave energy into electrical energy, comprising: a buoy which executes periodic forced vibrations with a natural frequency approximating the wave frequency along the vertical axis thereof in a manner that the buoy moves with respect to the wave surface; an air chamber in said buoy; a hydraulic piston in said buoy; a turbogenerator for converting the airflow kinetic energy into electrical energy; a turbine stage including rigidly fixed blades in said turbogenerator; a stator including rigidly fixed blades of said turbine stage; a rotor of said turbine stage, disposed downstream of said stator with respect to the direction of said airflow; a supplementary stator including rigidly fixed blades of said turbine stage, disposed downstream of said rotor with respect to the direction of said airflow and made symmetrical with said stator with respect to the plane of rotation of said rotor; a generator of said turbogenerator; a shaft of said generator; also mounted whereon is said rotor of said turbine stage; an air duct for said air chamber to communicate with said turbogenerator.

* * * * *

Notice of Adverse Decision in Interference

In Interference No. 99,543, involving Patent No. 3,922,739, I. A. Babintsev, APPARATUS FOR CONVERTING SEA WAVE ENERGY INTO ELECTRICAL ENERGY, final judgment adverse to the patentee was rendered Jan. 28, 1980, as to claim 1.

[*Official Gazette July 22, 1980.*]